United States Patent [19]

Lemelson

[11] 4,095,101
[45] June 13, 1978

[54] LIGHT CONDUCTOR HAVING ELECTRICAL CONDUCTORS EXTENDING LONGITUDINALLY OF SURFACE

[76] Inventor: Jerome H. Lemelson, 85 Rector St., Metuchen, N.J. 08840

[21] Appl. No.: 423,464

[22] Filed: Dec. 10, 1973

Related U.S. Application Data

[63] Continuation of Ser. No. 863,768, Oct. 2, 1969, abandoned, which is a continuation-in-part of Ser. No. 649,264, Jun. 27, 1967, abandoned, and a continuation in-part of Ser. No. 439,529, Mar. 15, 1965, abandoned. 1965, abandoned.

[51] Int. Cl.² .......................... G02B 5/14; H02G 3/00
[52] U.S. Cl. .................... 250/227; 174/70 R; 350/96.10
[58] Field of Search ......................... 313/373; 350/96 WG (U.S. only)

[56] References Cited

U.S. PATENT DOCUMENTS

| | | | |
|---|---|---|---|
| 2,911,568 | 11/1959 | Skay | 315/83 |
| 3,013,232 | 12/1961 | Lubin | 313/94 X |
| 3,465,159 | 9/1969 | Stern | 250/213 |
| 3,551,841 | 12/1970 | Harrick | 350/96 WG |

*Primary Examiner*—Robert Segal

[57] ABSTRACT

Electrical conducting devices are provided which are composed of a flexible core member, such as a plastic or glass filament, having bonded to its outer surface a plurality of conducting strips which extend longitudinally along the core member for substantially the entire length thereof. In one form, one or more transducers are deposited or otherwise secured to the core member, such as at the end thereof, and are electrically connected or coupled to the conducting strips to form part of a circuit composed of said strips.

11 Claims, 7 Drawing Figures

LIGHT CONDUCTOR HAVING ELECTRICAL CONDUCTORS EXTENDING LONGITUDINALLY OF SURFACE

RELATED APPLICATIONS

This is a continuation of application Ser. No. 863,768 filed Oct. 2, 1969, for Electrical Conductors, now abandoned, which was a continuation-in-part of Ser. No. 649,264, filed Jun. 27, 1967, abandoned, as a continuation-in-part of Ser. No. 439,529 filed Mar. 15, 1965, also abandoned.

SUMMARY OF THE INVENTION

This invention relates to new and improved structures in electrical devices and in particular to elongated, flexible conducting elements such as filaments of glass, plastic or other suitable material containing bonded to their outer surfaces, a plurality of conducting elements, such as metal strips, which extend substantially the length of the flexible cores on which they are secured or deposited. The flexible cores may comprise light transmitting glass or plastic permitting the device to be used both as a light conductor and an electrical conductor. One or more transducers such as photoelectric cells or other devices may be secured to the device to be energized by electrical energy conducted through the conducting elements secured to the surface of the flexible core.

Accordingly, it is a primary object of this invention to provide a new and improved structure in a flexible wire-like member having an insulating core and a plurality of strips of conducting material secured to the core.

Another object is to provide an improved structure in an electrical conductor for at least one electrical circuit, which may be formed of a relatively small diameter filament of plastic or glass.

Another object is to provide a new and improved flexible electrically conducting element in the shape of a fine filament and a transducer secured to one end thereof and electrically energizable by means of electrical energy conducted along said element.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 7:
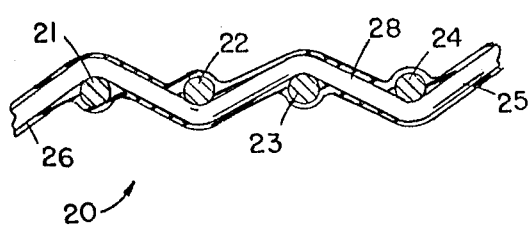

and FIG. 7 is an end view in partial cross-section of an electrically conducting cloth embodying certain features of the invention.

Figure 1:
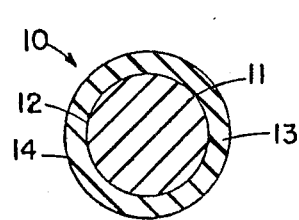
FIG. 1 is an end cross-sectional view of a fragment of an electrical conductor embodying certain of the teachings of this invention.
Figure 2:
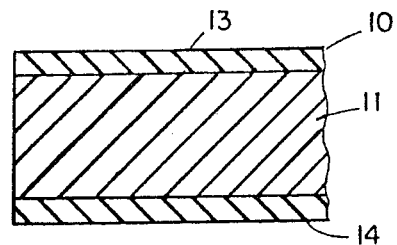
FIG. 2 is a side view of a portion of the conductor of FIG. 1.

In FIGS. 1 and 2 are shown an elongated cylindrical conductor 10, filament or wire 10 having a cylindrical external surface 14 and a core 11 of cylindrical external shape 12 formed of annelectrically conducting thermoplastic material and surrounded by a jacket or coating 13 which serves as means for insulating protecting and isolating the core 11 from the medium surrounding said conductor. In a preferred form of the invention, the core 11 comprises an electrically conducting polymer such as poly (1-Methyl-2-vinylpyridinium) TCNQ—, styrene/(1-m-butyl-2-vinylpyridinium-TCNQ-) copolymer and the coating or sheaving 13 surrounding said core comprises a flexible non-conducting polymer such as flexible polyvinyl chloride which is extruded in situ around the core polymer which may also be extrusion formed in a continuous operation. The resulting composite wire or filament 10 is flexible throughout its length and is physically different from the conventional plastic-coated metal wire conductor which is subject to earlier bending failure and is physically different from and incapable of being bent or flexed in the manner of the composite dual polymer article 10 of FIG. 1.

While for similar conducting cross sectional areas the conducting element 11 of FIG. 1 will not carry the wattage of metal such as copper, nevertheless it may be used to conduct signals such as switching and code signals utilized in many computer and instrumentation functions.

Figure 3:
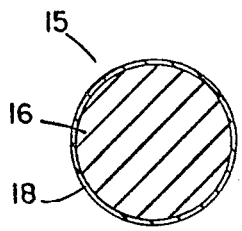
FIG. 3 is an end cross-sectional view of another form of conductor within the purview of this invention.
Figure 4:
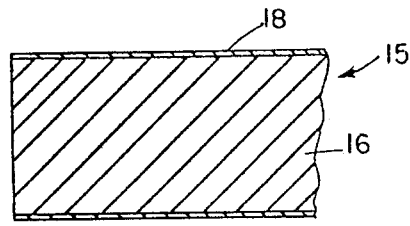
FIG. 4 is a cross-sectional view of a portion of the conductor of FIG. 3.

In FIGS. 3 and 4 are shown a modified form of the invention in which the core of a composite filament or thread is an insulating material which is coated or jacketed with a conducting polymer of the type employed to form the core 11 of the article 10 of FIG. 1. The composite elongated member 15 may have various applications depending on the materials employed for the core and coating. In a preferred embodiment, the core 16 comprises a textile element such as a thread or filament of suitable polymer or glass which may be woven into a cloth and the surrounding jacket 18 a coating of electrically conducting plastic of the type provided in the core 11 of FIG. 1. Textile material such as cloth or fabrics made of filament or threads so coated will not retain a static electrical charge particularly if the conductive coating is grounded. A cloth woven of a multiplicity of such filaments having surface contact with each other may therefore serve many useful purposes particularly where static electricity is undesirable or dangerous.

The core 16 of the composite filament 15 of FIG. 3 may comprise various suitable resins such as polyesters, polyamides, cellulose acetates and the like formed as filaments or may comprise a multiplicity of separated filaments or formed as a multi-strand thread.

The devices of FIGS. 1 and 2 are subject to a number of variations in shape and composition. The illustrated cylindrical shapes may be changed or varied to include cross-sections of any suitable contour including that of flat ribbon-like configurations and irregular surface shapes. In both FIGS. 1 and 3, the cores may comprise a plurality of filaments or multi-stranded threads arranged as a thread or separated from each other. In FIG. 1, a plurality of separate polymeric conductors or filaments separated from each other and each adapted to carry separated electrical signals may comprise the core portion of the composite article. In FIG. 3 the core portion 16 may serve to carry substantially the entire load of the composite member. The core portion 16 may also comprise a light pipe such as transparent plastic or glass of single or multiple filament configuration and the jacket 18 may comprise any suitable conducting material such as the described polymer or a metal film, which may serve multiple purposes including (a) protecting the core 18, (b) conducting electrical energy or signals along the surface of the core, (c) reflecting light directed along the core so that the core may serve as a light pipe. As such, the jacket is preferably a material of a higher refractive index than the core.

Figure 5:
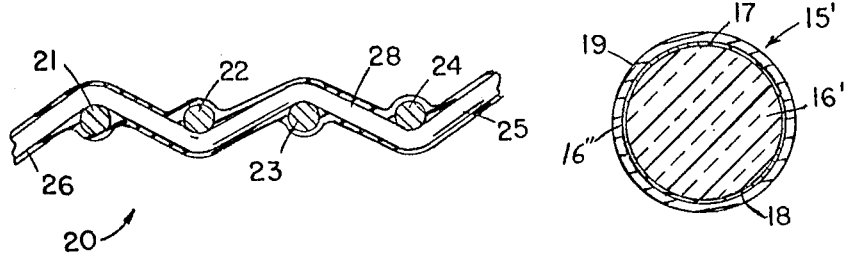
FIG. 5 is an end cross-sectional view of a modified form of the conductor of FIGS. 3 and 4.

In FIG. 5 is shown a modified form of the conducting filament or wire of FIGS. 3 and 4. The composite filament 15' comprises a core 16' of cylindrical or other suitable configuration and made of any suitable electrically insulating material such as a polymer or ceramic. In a preferred form of the structure of FIG. 5, the core portion 16' of the composite filament 15' comprises a transparent glass filament or transparent plastic capable of conducting light along its length, commonly known as light pipes or optical fibers and may vary in diameter from several thousands of an inch to 0.020 inches or more. Extending the length of the core 16' and each coating less than one half of the cylindrical surface thereof are respective coatings 17 and 18 of electrically conducting material such as the described conducting polymer or metal film such as aluminum, copper or other metal which has been vapor deposited, plated or otherwise provided along respective portions of the surface of core 16'. If two such electrically isolated and separated conducting coatings or films 17 and 18 are provided along the outer surface of the core to which they are bonded, they may be connected in series circuit with a suitable source of electrical energy so as to conduct power or electrical signals along the filament 15' with respect to, for example, a transducer which is electrically connected or coupled to said conductive strips 17 and 18. Surrounding the exposed surface portions 16'' of the core 16' and the strip-like coatings or films 17 and 18 is an outer coating 19 of suitable polymerized to protect and electrically insulate the conductors 17 and 18.

The conducting coatings 17 and 18 may comprise vapor deposited metal film several millions of an inch thick or electro-deposited metal or the conducting plastic described applied to a depth of as much as one or two thousands of an inch or more.

Modifications to the structure 15' of FIG. 5 may include the following:

(a) A plurality of conducting elements or separated portions of conducting film in addition to those two illustrated in FIG. 5 may be provided as thin, parallel strip-like formations extending parallel to the longitudinal axis of the filament.

(b) The conducting layer or coating of FIG. 5 may extend as one or more spiral-like formations of metal film or conducting plastic extending along the outer surface of core 16' as a single layer or a plurality of insurlated elements or a continuation of one or more elements with each layer formation thereof being insulated from the layer below to form an electrical inductor or multilayer resistor.

(c) One or more transducers made of suitable light generating, light sensitive, temperature or pressure sensitive materials capable of providing electrical energy which varies as the physical variable it senses varies, may be deposited between or otherwise bonded to the conductors 17 and 18 such as against the exposed surface portions 16'' between the strip-like formations or at one end of the filament conductor 15' as illustrated in FIG. 5'.

Figure 6:
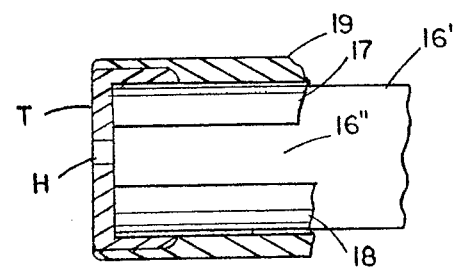
FIG. 6 is a side view of a modified form of the conductor of FIG. 5.

In FIG. 6 is illustrated a side view of the end of the conductor of FIG. 5 modified to include a transducer T bonded to said end and electrically connected to narrower conducting strips disposed as are strips 17 and 18 on opposite surface portions of the core 16'. The transducer T is shown bonded to the end face of the filament 15' and deposited or otherwise assembled thereon so as to be electrically coupled or connected to the separated conducting strips 17 and 18 in series circuit therewith. Thus electrical energy may be conducted to the transducer and/or therefrom along the conductor 15' for either energizing the transducer or supplying electrical signals indicative of the ambient condition measured around the transducer. The transducer T may comprise a film or coating of photoelectric material such as cadmium sulfide which is either radiation sensitive to act as a light sensor or is capable of emitting light when electrically energized by current conducted by the deposited films on the core 16'. Cadmium sulfide may also be grown or otherwise provided on the end of member 15' as an ultra-thin film of crystalline cadmium sulfide and may be used to generate ultrasonic vibrations when energized as described.

In FIG. 6, the transducer T is grown, coated on or vapor deposited at the end of member 15' over the deposited conducting strips 17 and 18 before the protective overcoating 19 is applied so as to permit respective portions of the transducer to become electrically connected to respective of the conducting strips. The insulating overcoating 19 is thus shown also covering a portion of the transducer which overlaps the sidewall of the cylindrical member on which it is disposed. Notation H refers to an opening or window in the center of the transducer T which may be provided if the core 16' is a light pipe to permit light to be passed to and/or from said light pipe from beyond the end of said assembly. A portion of the coating 19 may also extend over the end face of the transducer to protect and/or insulate same. The notation T may also define a metal end cap which is coated or crimp fitted on the end of the conductor and which may be particularly applied to the end of composite filament 15 of FIG. 4 to serve as a plug means therefore or as a connector.

In FIG. 7 is shown another form of the invention comprising a textile member 20 such as a cloth formed of a plurality of crossed filaments or threads designated 21–25 which may be combined by known techniques such as weaving. Coating at least one surface 26 of the member 20 is an electrically conducting polymer of the type described. The conductive coating 26 may be provided by extrusion onto the cloth 20 as a film, by roller coating, dipping or spray coating. It may be applied so as to cover just the individual filaments leaving spaces 28 between filaments to provide a porous mesh or screen which is electrically conducting or may completely cover the interstices between filaments as illustrated to also render the cloth non-porous. The coating 26 may also be provided to bond the crossed threads together where they cross each other and to laminate the cloth member 20 to another member of sheet (not shown).

I claim:

1. A composite electrical assembly comprising in combination:

an elongated core member which is flexible throughout its length and is made of an electrically insulating material, a plurality of non-contacting strip-like electrical conducting elements extending parallel to each other and longitudinally along the outer surface of said elongated flexible core member wherein each of said strip-like conducting elements is bonded in integral assembly with said flexible core member, an electrical wave energy transducing means secured to said outer surface of said flexible core member, said electrical wave energy transducing means being electrically connected and in circuit with respective of said strip-like conducting elements extending longitudinally along said outer surface of said flexible core member whereby said strip-like conducting elements may serve as conductors of electrical energy with respect to said wave energy transducing means.

2. An electrical assembly in accordance with claim 1 wherein said core member is made of a light transmitting material and is of substantially constant cross-section along its length and is capable of transmitting light along its length and performing as a light pipe.

3. A composite electrical assembly in accordance with claim 1 wherein said electrical wave energy transducing means is secured to said flexible core member at one end thereof.

4. A composite electrical assembly in accordance with claim 3 wherein said electrical wave energy transducing means is bonded to the end of said elongated flexible core member and is connected to the ends of said strip-like electrical conducting elements.

5. A composite electrical assembly in accordance with claim 1 wherein said electrical wave energy transducing means is formed of a material which is coated against exposed portions of said strip-like conducting elements.

6. A composite electrical assembly in accordance with claim 3 wherein said electrical wave energy transducing means is formed of a material which is deposited in situ at the end of said core material and is disposed against respective exposed portions of said strip-like electrical conducting elements and wherein said electrical wave energy transducing means material is bonded to both said core member and said conducting elements.

7. A composite electrical assembly in accordance with claim 1 including a coating of insulating material disposed around said core member and over said plurality of strip-like electrical conducting elements.

8. A composite electrical assembly in accordance with claim 1 wherein said strip-like conducting elements are each formed of a film of electrically conducting material which has been deposited and bonded directly onto the outer surface of said flexible core member.

9. A composite electrical assembly in accordance with claim 1 wherein said core member is substantially cylindrical in shape and said strip-like electrical conducting elements are each coated onto less than one-half of the outer cylindrical surface of the core member.

10. A composite assembly in accordance with claim 1 wherein said electrical wave energy transducing means is composed of semi-conducting material which is deposited in situ at the end of said core member and is electrically connected to said strip-like conducting elements so as to be energizeable when electrical energy is applied to the circuit formed of said conducting elements and said semi-conducting material.

11. A composite, elongated electrical assembly comprising in combination:

an elongated core member of substantially constant cross-section which core member is flexible throughout its length and is made of an electrically insulating material, a plurality of non-contacting strip-like electrical conducting elements of substantially constant width and thickness extending parallel to each other longitudinally along the outer surface of said elongated flexible core member and bonded in integral assembly with said core member, said flexible core member being made at least in part of a light transmitting material which is capable of conducting and guiding light along its length and of performing as a light pipe, and an electrical device secured to one end of said elongated electrical assembly and electrically connected to said strip-like electrical conducting elements disposed on said flexible core member.

* * * * *